Figure 1:
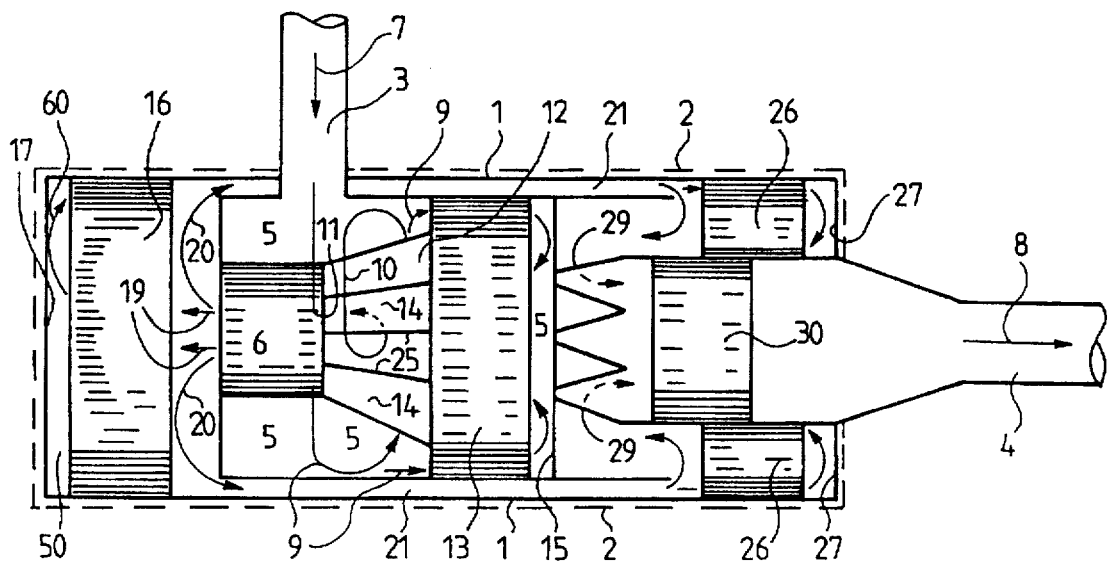

United States Patent [19]
Aitta et al.

[11] Patent Number: 5,685,143
[45] Date of Patent: Nov. 11, 1997

[54] CATALYTIC EXHAUST GAS PURIFIER AND CATALYTIC METHOD OF PURIFYING EXHAUST GAS

[75] Inventors: Eero Aitta, Jokirinne; Eero Kynsilehto, Kiiminki, both of Finland

[73] Assignee: Kat-Tecnik Oy, Kiiminki, Finland

[21] Appl. No.: 424,442

[22] PCT Filed: Oct. 29, 1993

[86] PCT No.: PCT/FI93/00444
§ 371 Date: Jun. 16, 1995
§ 102(e) Date: Jun. 16, 1995

[87] PCT Pub. No.: WO94/10430
PCT Pub. Date: May 11, 1994

[30] Foreign Application Priority Data

Oct. 30, 1992 [FI] Finland ............... 924935

[51] Int. Cl.⁶ ............... F01N 3/02; F01N 3/20
[52] U.S. Cl. ............... 60/274; 60/297; 422/169
[58] Field of Search ............... 60/297, 274; 422/169

[56] References Cited

U.S. PATENT DOCUMENTS

| | | | |
|---|---|---|---|
| 3,061,416 | 10/1962 | Kazokas | 60/297 |
| 3,132,473 | 5/1964 | Hass | 60/297 |
| 3,421,315 | 1/1969 | Aoi | 60/297 |
| 4,858,431 | 8/1989 | Leonhard | 60/297 |

FOREIGN PATENT DOCUMENTS

| | | |
|---|---|---|
| 0412345 | 2/1991 | European Pat. Off. . |
| 0468919 | 7/1991 | European Pat. Off. . |
| 3340682 | 5/1985 | Germany . |
| 2122914 | 1/1984 | United Kingdom . |

*Primary Examiner*—Douglas Hart
*Attorney, Agent, or Firm*—Ladas & Parry

[57] ABSTRACT

The invention relates to an exhaust gas purifier and a catalytic method of purifying exhaust gas, in which exhaust gas led into a combustion chamber (5) of the exhaust gas purifier, the exhaust gas is brought to centrifugal rotational motion, by which the exhaust gas flow is divided into a particle flow (9) and an actual gas flow (10). The particle flow (9) separated from the actual gas flow is retarded in relation to the actual gas flow (10). The direction of propagation of the particle flow is turned to be essentially opposite and the particle flow is rejoined to the actual gas flow and the rejoined exhaust gas flow is directed through a catalyst element (6).

10 Claims, 3 Drawing Sheets

CATALYTIC EXHAUST GAS PURIFIER AND CATALYTIC METHOD OF PURIFYING EXHAUST GAS

The invention relates to a catalytic exhaust gas purifier used especially for purifying exhaust gas emitted from diesel engines and containing particles, which exhaust gas purifier comprises a casing structure, in which are disposed a means for feeding exhaust gas into the exhaust gas purifier, a means for removing exhaust gas from the exhaust gas purifier, a combustion chamber and at least one catalyst element, the means for feeding exhaust gas being most preferably arranged in the combustion chamber of the exhaust gas purifier in such a way that an exhaust gas flow may be turned into rotational motion within the combustion chamber, whereby the exhaust gas flow is divided into a particle flow and an actual gas flow, in which exhaust gas purifier the catalyst element is arranged in the combustion chamber in such a way that at least the particle flow is brought into rotational motion around the catalyst element in the combustion chamber.

The invention additionally relates to a catalytic method of purifying exhaust gas, in which method exhaust gas is led into a combustion chamber of an exhaust gas purifier, the exhaust gas is brought into centrifugal rotational motion, by which the exhaust gas flow is divided into a particle flow and an actual gas flow.

The exhaust gas purifier of the invention may be applied for instance to diesel-driven vehicles, such as passenger cars, delivery vans and heavier vehicles, like buses, lorries and working machines.

Drawbacks of the catalytic diesel purifiers known at present are expressly associated with removing, i.e. oxidizing, carbon particles present in exhaust gas, being small particles of a size class below one micrometer, from the exhaust gas, yet by means of a simple and reliable structure. In known solutions, expensive and complicated device solutions regenerating the efficiency of a filter by oxidizing or chemically are required to provide a sufficient purifying effect. Some solutions additionally comprise a two-stream system containing two similar equipments in parallel, by means of which the half clogged by carbon particles is closed by valves and the other clean half is taken into use. From EP-020 766 is known an exhaust gas purifier utilizing centrifugal force for a separation of carbon particles, in which purifier the catalyst itself is positioned in relation to an incoming exhaust gas flow in such a way that the exhaust gas purifier needs, in order to function, a separate burner emitting additional heat spread by a hole tube, by which heat the carbon particles are oxidized. Accordingly, the solution set forth in this publication is a regenerative two-stream system by nature and not a continuous one, as the solution according to the present invention. In the solution of this EP publication, the means feeding exhaust gas and the catalyst element are disposed at opposite ends of the exhaust gas purifier.

Moreover, from the U.S. Pat. No. 5,052,178, EP-056 584, DE-40 25 933, DE-40 12 719 and U.S. Pat. No. 4,725,411 are known soot catchers or regenerative exhaust gas purifiers provided with an additional burner. The structure, the easiness of manufacture as well as the efficiency of these purifiers are not on a sufficiently good level.

The patents GB-2 122 914, DE-33 40 682 and EP-468 919 disclose exhaust gas purifiers, in which a catalyst cell is positioned in the middle part of a combustion cell and in which substance containing particles rotates along the edges of the combustion chamber thanks to centrifugal force. In these solutions, the substance containing particles parts from the actual gas flow, but is yet brought forward along the same flow path without any retardation of the particle flow at all.

The object of this invention is to provide a novel exhaust gas purifier, especially for diesel engines, which avoids the problems associated with the known solutions.

This object is achieved by means of an exhaust gas purifier, which is characterized in that the exhaust gas purifier comprises means for retarding the particle flow separated from the actual gas flow and means for rejoining the retarded particle flow to the actual gas flow.

The purifying method according to the invention is characterized in that the particle flow separated from the actual gas flow is retarded in relation to the actual gas flow, the direction of propagation of the particle flow is turned to be essentially opposite and the particle flow is rejoined to the actual gas flow and the rejoined exhaust gas flow is directed through a catalyst element in the combustion chamber.

The exhaust gas purifier according to the invention is based on the idea that a flow containing carbon particles is retarded and its carbon content is decreased before the flow is rejoined to an actual gas flow and before the rejoined gas flow is purified with a catalyst element included in a combustion cell. In the novel exhaust gas purifier, the catalyst element is disposed in the combustion chamber in such a way that, at the beginning, the exhaust gas coming in warms up the catalyst element still having a low temperature and the roles change when the system gets warm, i.e. the catalyst element heated during catalytic reactions warms up the incoming exhaust gas to be brought into centrifugal rotational motion around the catalyst at just the right place, i.e. in the vicinity of the means feeding exhaust gas into the combustion chamber.

Several considerable advantages are achieved by means of the solution according to the invention. By separating the particle flow and the actual gas flow, by retarding the particle flow and by rejoining it to the main flow, the advantage is achieved that the heat created by oxidizing carbon particles moves from the side flow to the main flow again. The exhaust gas purifier according to the invention constitutes a catalytic purifier having a simple structure and being safe to operate. In the exhaust gas purifier, the mutual location of the catalyst element, the combustion chamber and the means feeding exhaust gas into the combustion chamber as well as the remaining structure of the exhaust gas purifier have been implemented in such a way that the exhaust gas purifier will constitute a continuously working purifier, which does not clog and which is capable of maintaining a sufficiently high temperature for performing oxidizing reactions thanks to its simple and advantageous structure, also when the diesel engine runs idle. The solution of the invention suits both for first fitting and retrofitting.

Figure 2:
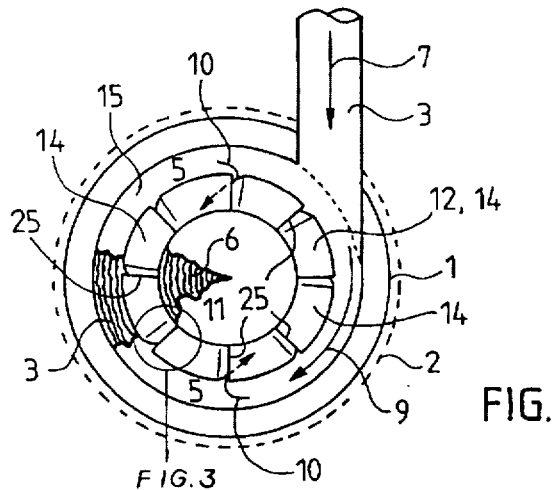
Figure 3:
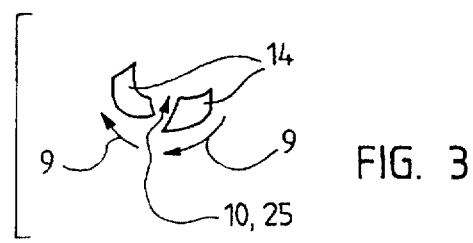
Figure 4:
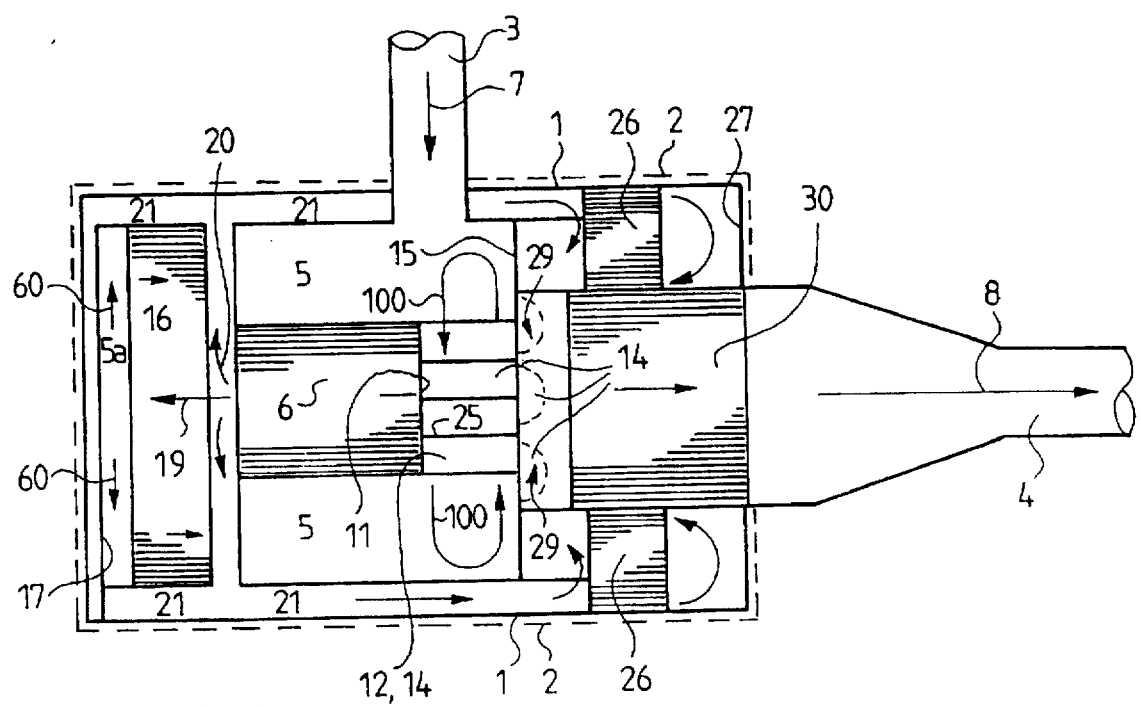
Figure 5:
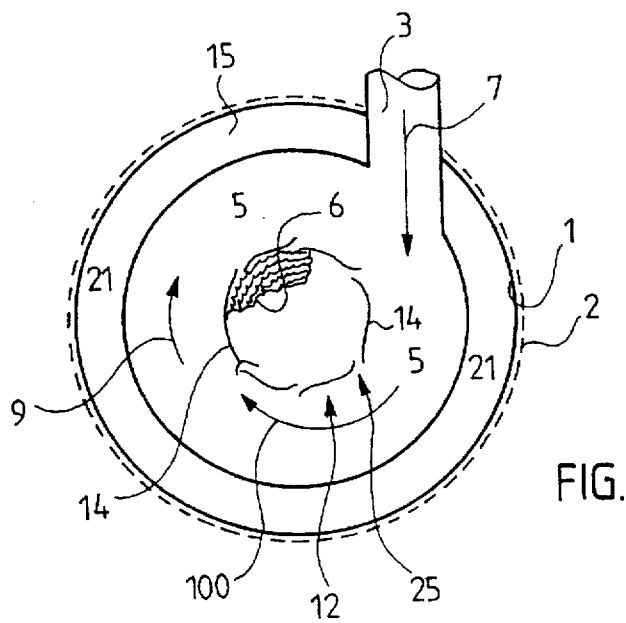
Figure 6:
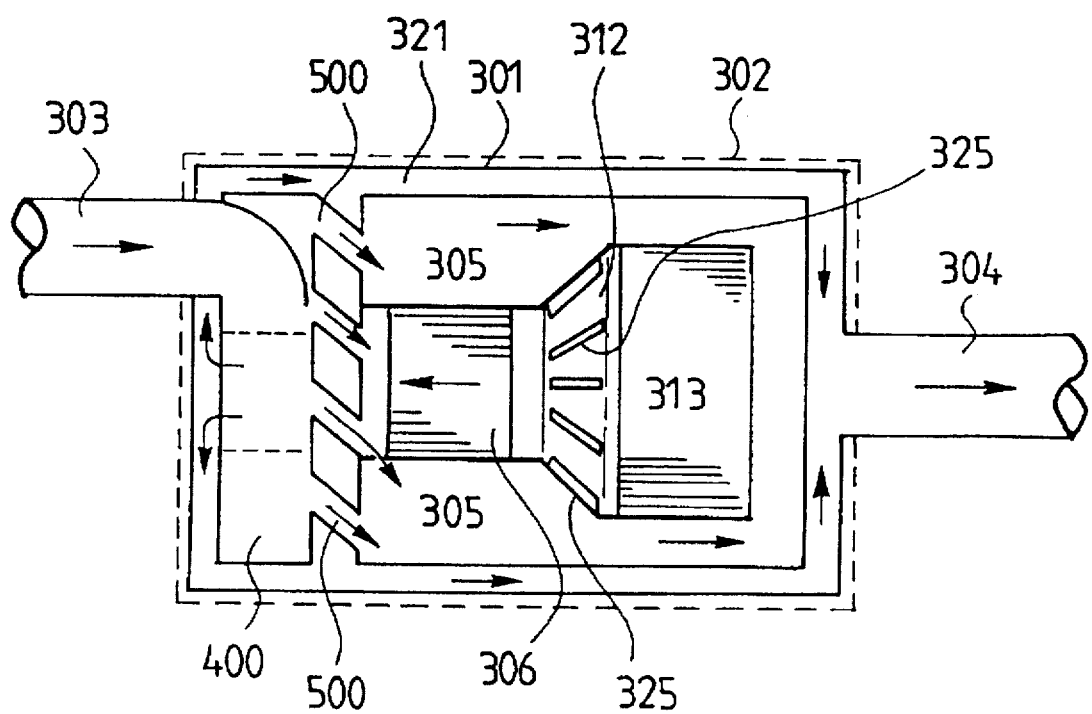

The invention will be described in the following in greater detail with reference to the attached drawings, in which FIG. 1 shows a general view of a first embodiment of an exhaust gas purifier, FIG. 2 shows a general view of a cross-section of the exhaust gas purifier according to FIG. 1, FIG. 3 shows an encircled detail of FIG. 2, FIG. 4 shows a general view of a second embodiment of the exhaust gas purifier, FIG. 5 shows a general view of a cross-section of the exhaust gas purifier according to FIG. 4, and FIG. 6 shows a general view of a third embodiment of the exhaust gas purifier.

According to FIG. 1, a catalytic exhaust gas purifier for diesel engines comprises a casing structure 1, within which the components of the exhaust gas purifier are arranged. The cross-section of the casing structure is circular, as also appears from FIG. 2. The casing structure 1 is preferably surrounded by a thermal insulation 2 indicated by a broken line in FIGS. 1 and 2. The exhaust gas purifier further comprises a means 3, such as an inlet pipe, for feeding exhaust gas into the exhaust gas purifier, a means 4 for removing exhaust gas from the exhaust gas purifier, a combustion chamber 5 and at least one catalyst element 6, here called the first catalyst element. The catalyst element 6, i.e. catalyst cell, may be coiled of diesel catalyst strip manufactured by Kemira Oy, for instance. The exhaust gas flow from the diesel engine to the combustion chamber of the exhaust gas purifier is indicated by the arrow 7. Correspondingly, the purified exhaust gas flow to be removed from the exhaust gas purifier is indicated by the arrow 8. The means feeding exhaust gas is arranged in the combustion chamber 5 in such a way that the exhaust gas flow 7 may be turned into centrifugal rotational motion within the combustion chamber 5 in the manner shown by the arrow 9. Accordingly, the exhaust gas 7 containing particles and coming from the engine is led into the combustion chamber 5, in which the particles rotate on account of centrifugal force within the spherical chamber maximally along a periphery of circle as wide as the inner diameter of the combustion chamber 5 allows.

Thanks to centrifugal force, the part of the exhaust gas which is more free from particles rotates along a periphery of circle having a smaller diameter in a manner shown by the arrow 10. The exhaust gas flow 7 is thus divided into a flow 9 containing particles and an actual gas flow 10. According to FIGS. 1 and 2, the catalyst element, i.e. catalyst cell 6, is positioned in the middle part of the combustion chamber in the vicinity of the means 3 feeding exhaust gas flow in such a way that the means feeding exhaust gas flow is arranged to turn at least the particle flow 9 to rotate around the catalyst element 6 in the combustion chamber. Then the incoming exhaust gas flow 7 and its separated part components 9 and 10 warm up at the beginning the catalyst cell 6, which is still cold after starting. At a later stage the roles change, which means that the catalyst cell 6, warmed up when oxidizing impurities (HC, CO, NOx) of the exhaust gas, heats the exhaust gas flow coming into the combustion chamber.

The exhaust gas purifier comprises means for retarding the particle flow and means for rejoining the particle flow to the actual gas flow. Thereby the first means for retarding the particle flow consist preferably in practice of a second catalyst element 13, which certainly is, with respect to the propagation of the exhaust gas flow, the first to meet the side flow 9 comprising only particles. The second catalyst element 13 has a rather high hole density of e.g. 600 holes per square inch, due to which it also creates counterpressure and thus acts as the means for retarding the side flow, i.e. the particle flow 9, and naturally acts by means of catalytic substances therein as an accelerator of an oxidizing reaction at the combustion of impurities of carbon particles. The counterpressure of the catalyst cell 13 also intensifies the division of the exhaust gas flow into the main flow (actual gas flow 10) and the side flow (particle flow 9) to be retarded. By retarding the side flow (particle flow), the advantage is achieved that there is more time for oxidizing particles in the free space of the very combustion chamber already and the contact time between a catalytically treated reaction surface and the particles will be longer also in the catalyst cell 13. By separating the particle flow 9 and the gas flow 10, by retarding the particle flow 9 and by rejoining it to the main flow, the advantage is achieved that the heat arising from the oxidation of (carbon) particles moves from the side flow to the main flow again.

In combination with the catalyst element 6 arranged in the middle part of the combustion chamber 5, a means 12 for directing the gas flow 10 to the catalyst element over an end 11 of the catalyst element is arranged also in the middle part of the combustion chamber. This means may be for example an at least approximately symmetric wing structure 12 according to FIGS. 1 to 3, thus comprising several wings 14, between which through openings 25 the main flow, i.e. the part of the exhaust gas which is more free from particles, is directed to a smaller periphery into the very wing structure 12 and from there further over the end 11 of the first catalyst cell into the catalyst cell 6. An advantage of the wing structure 12 directing the main flow is its ability of catching the main flow being more free from particles to a smaller periphery from the middle of the particle flow. The wing structure also intensifies the division of the exhaust gas into the main flow and the side flow.

First means for rejoining the particle flow 9 to the actual gas flow actually consist preferably of a wall flange 15, which is arranged to turn the retarded particle flow (side flow) having penetrated the catalyst cell 13 through the catalyst cell 13 back into the wing structure. Thanks to the wing structure and the counterpressure of the catalyst cell 13, the main flow 10 joins within the wing structure, after having penetrated the wing structure, the once purified and retarded particle flow returning from the catalyst cell 13, after which the rejoined flow is directed to a first laminarizing catalyst cell 6, which is thus located centrally in the combustion chamber 5. Oxidizing reactions in the catalyst cell 6 create heat and so the catalyst cell 6 is capable of heating the air coming into the combustion chamber. The wall 15 and the means 12 directing the gas flow between the catalyst elements 13 and 6 constitute means for rejoining the particle flow 9 to the actual gas flow 10. In addition to the catalyst element 13, also the wall 15 acts as a retarding means, because it turns the particle flow in the opposite direction. The particle flow also runs a longer distance.

Consequently, the particle flow 9 propagates within the combustion chamber 5 to the second catalyst cell 13, in which the impurities of the particles continue being oxidized after the oxidation started in the very combustion chamber 5. The wall flange causes a turn and thus contributes to achieving a rejoined flow. Another task of the wall flange is to divide the exhaust gas purifier into sections in such a way that the temperature of the combustion chamber remains sufficient. Actually, the wall 15 acts as a wall of the combustion chamber at the same time.

The counterpressure and the retardation of the particle flow required may be provided according to FIG. 4 also without a catalyst cell by means of a wall only. Then the wall acts both as retarding means and rejoining means when it turns the flow.

In a preferred embodiment of the invention, the exhaust gas purifier comprises at least two successive means for retarding the particle flow and for rejoining the particle flow to the actual gas flow, whereby the retardation and oxidation of the particle flow can be made still more efficient. The above structure in the case according to FIGS. 1 and 2 means that the exhaust gas purifier comprises a third catalyst element 16 and a wall 17, which are positioned outside the actual main combustion chamber 5 in the exhaust gas flow direction on the side of the combustion chamber different from that indicated by the actual direction of propagation of the exhaust gas. By means of this structure, the range of motion and the oxidation time may be further increased. The propagating exhaust gas flow to be obtained from the catalyst cell 6 from the middle portion of the combustion chamber is again divided into a part 19 containing particles and a gas flow 20. The means performing the division is the above-mentioned retarding means, i.e. the third catalyst cell 16, which is relatively dense. On the other hand, the gas flow 20 searches for a more free route and begins to propagate in the opposite direction along a jacket space 21 between the casing structure and the combustion chamber. Into this jacket space is also directed a particle flow 60 retarded and purified by the third catalyst cell 16 and turned by the second wall 17, which flow returns through the catalyst cell 16 and rejoins retarded to the gas flow 20. In this preferred embodiment, the exhaust gas leaves the combustion chamber, guided by the counterpressure caused by the storing and combustion cell 13 for particles, through openings 25 in the wing structure or another similar directing structure 12, while the gas 9 containing particles continues rotating and is directed to the storing and combustion cell 13. The gas leaving the combustion chamber as well as the particle residues are led to the third catalyst cell 16. The gas free from particles is led into the jacket space between the spherical combustion space and an outer shell, after which the very last particles are led to a fourth storing and combustion cell 26, from which the exhaust gas, turned by a wall 27, is guided into flow openings 29 and heats the intermediate wall 15 simultaneously, behind which wall there is the combustion chamber space 5. The final purification of the exhaust gas takes place in the last catalyst cell 30, through which the entire amount of exhaust gas flows and exits in the direction of the arrow 8. The wall 17 also retards the flow, because it turns the flow.

In the preferred embodiment of the invention, the means for retarding the particle flow, i.e. the catalyst cells 13, 16, 30, and the means for rejoining the particle flow to the actual gas flow, i.e. the walls 15, 17 and 27, are disposed in the casing structure in such a way that they are arranged to turn the exhaust gas flow in the opposite direction. The particle flow may then be transported a long distance within the purifier and additional retardation is provided by means of turns. It is essential that the catalyst cells and the walls are arranged successively in such a way that it is possible to turn the flow. Further in the preferred embodiment of the invention, at least one set of retarding and rejoining means, i.e. the catalyst cell 13 and the wall 15, are arranged in the very combustion chamber 5, whereby it is possible to intensify the oxidation, separation and rejoining of the gases and to provide a simple structure.

The means directing the gas flow to the catalyst 6, i.e. the wing structure, is according to FIG. 1 a preferably conical means positioned between two catalyst elements 6 and 13. On the one hand, a conicity in the direction from the left to the right improves the directability of the particles to the edge area of the catalyst cell 13 and, on the other hand, collects and directs well the flow returning from the catalyst cell 13 within the actual directing means. The diameter of the directing conical means at the catalyst 6 end corresponds essentially to the diameter of the very catalyst 6, whereby the directing means 12, i.e. preferably the wing structure, directs the main flow 10 and also the particle flow returning from the catalyst cell 13 together towards the catalyst cell 6.

The densities and diameters of the catalyst cells 13 and 6 on both sides of the directing wing structure 12 differ considerably from each other therein that the density of the catalyst cell 13 having a bigger diameter, i.e. the first catalyst cell in the flow direction, is higher than the density of the later catalyst cell, i.e. the less dense catalyst cell 6, for instance in such a manner that the density of the catalyst cell 13 is 600 holes per square inch and the density of the catalyst cell 6 is 400 holes per square inch. Appropriate counterpressures and retarding effect expressly for the particle flow are provided through suitably selected densities.

From FIGS. 2 and 3 can be seen that, in the preferred embodiment of the invention, the means 12, e.g. the wing structure, directing the gas flow to the catalyst element is a circle symmetric means comprising several openings 25, which openings are arranged at least partially away from the direction of rotation of the exhaust gas flow directed to rotate around said means, whereby it is very difficult for the carbon particles, due to the slowness of their mass, to turn in the combustion chamber so sharply that considerable amounts of particles would pass through the openings of the wing structure. Accordingly, this structure contributes to an efficient division of the flows into the particle flow 9 and the gas flow 10.

FIGS. 4 and 5 show a second embodiment of the exhaust gas purifier according to the invention, which embodiment actually differs from the first embodiment therein that instead of the catalyst cell 13 and the wall 15 shown in FIG. 1 there is only the wall 15, due to which the catalyst cell 6 of the combustion chamber serves as the first catalyst cell for the whole flow. In the version of FIG. 1, the particle flow was retarded by the catalyst cell 13. The basic structure of the second embodiment according to the FIGS. 4 and 5 is rather similar to the structure according to FIGS. 1 to 3 described thoroughly above already, except for a second significant difference consisting of that the catalyst cell 16 outside the actual combustion chamber, the purpose of which catalyst cell is to retard the particle flow and to oxidize particles, is arranged in a separate chamber 50, whereby the jacket space 21 is arranged to surround also the catalyst cell 16 and the separate combustion chamber 50. This solution improves the oxidation in the catalyst cell 16.

Accordingly, the exhaust gas purifier of FIGS. 1 to 3 comprises a casing structure containing the combustion chamber 5, the catalyst cell 6 and the flow directing means, directing the flow to a smaller periphery and arranged in connection with the catalyst cell. The structure according to FIGS. 4 and 5 functions mainly in the same way as described above, and therefore, reference is made to the above description. One difference is that the whole flow 100 passes homogeneously through the openings 25 of the directing wing structure.

FIG. 6 shows a schematical general view of a third embodiment of the exhaust gas purifier. The exhaust gas purifier comprises the same components as for instance the purifier of FIG. 1, viz. a casing structure 301, an insulation 302, an inlet pipe 303, an outlet pipe 304, a combustion chamber 305, a first catalyst element 306, a second catalyst element 313 and a directing means 312 between the catalyst elements. The directing means 312 comprises openings 325, through which the actual gas flow, which is free from particles, propagates to the catalyst 306. Into the catalyst cell 306 and the directing means 312 is also directed a retarded particle flow coming from the catalyst element 313, which flow has earlier propagated as far as to a wall 315 of the combustion chamber 305 and turned from there in the opposite direction towards the catalyst cell 313. From the catalyst cell 306 the flow propagates through a preheating chamber 400 and turns from a wall 317 towards a jacket space 321 and propagates from there into the outlet pipe 304. The new structures of FIG. 6 are the preheating chamber 400 and flow controllers 500 between the preheating chamber 400 and the actual combustion chamber 305, which controllers may be for instance small pipes, which transport the gas coming from the preheating chamber 400 into the actual combustion chamber 305. From FIG. 6 is seen that the flow controllers 500 are positioned obliquely, i.e. to deviate from the axial direction, which embodiment contributes to a separation of the particle flow and the actual gas flow based on centrifugal force. The flow controllers 500, i.e. the short pipes 500, are positioned so as to form a complete circle between the combustion chamber 305 and the preheating chamber 400.

Exhaust gas measurements relating to a clarification of the function of a diesel catalyser have been made in an automobile laboratory with the exhaust gas purifier of the invention shown in FIG. 1. The measurements were made with diesel delivery vans without a purifier and with a purifier mounted in the exhaust pipe system. The delivery vans were used vans and in a moderate condition with respect to the engine and spraying devices and adjustments.

In the measurements made in the laboratory, a smoke value HSU of the exhaust gases was determined. The speed of rotation of the engine of the measured cars was raised from the idling speed of rotation to the maximum speed of rotation within about 2 to 3 seconds. The engine was not loaded externally and the test was repeated four times and the measurements were made separately without an exhaust gas purifier and with an exhaust gas purifier. The measuring device used was a smoke recorder Lucas Hartridge Smokemeter-4, in which the smoke value of the exhaust gas is determined on opacity principle, meaning a measurement based on light transparency. From the measuring results is seen that the smoke values of a Ford Transit delivery van decrease to approximately a half when an exhaust gas purifier is used. The smoke values of a Volkswagen LT28D also decrease significantly and the purifier is capable of reducing particle emissions from diesel exhaust gases considerably under favourable circumstances.

TABLE 1

(Without catalyser, Ford Transit)

| RUN NO. | PEAKMIN HSURPM | MAX RPM | TIME SEC |
|---|---|---|---|
| 1) | 21.8742 | 4235 | 03.0 |
| 2) | 22.6935 | 4235 | 02.5 |
| 3) | 19.6900 | 4235 | 02.9 |
| 4) | 23.7900 | 4235 | 02.3 |

AVR = 21.9 HSU, average smoke value based on four measurements

TABLE 2

(catalyser, Ford Transit)

| RUN NO. | PEAKMIN HSURPM | MAX RPM | TIME SEC |
|---|---|---|---|
| 1) | 10.0867 | 4235 | 02.2 |
| 2) | 10.1867 | 4235 | 02.5 |
| 3) | 10.5837 | 4235 | 02.7 |
| 4) | 09.6857 | 4114 | 02.5 |

AVR = 10.0 HSU

TABLE 3

(without catalyser, Volkswagen)

| RUN NO. | PEAKMIN HSURPM | MAX RPM | TIME SEC |
|---|---|---|---|
| 1) | 37.71345 | 6000 | 00.2 |
| 2) | 43.21548 | 6000 | 00.2 |
| 3) | 43.73130 | 4800 | 00.0 |
| 4) | 38.51384 | 5142 | 00.1 |

AVR = 40.7 HSU

TABLE 4

(catalyser, Volkswagen)

| RUN NO. | PEAK HSURPM | MIN RPM | MAX SEC | TIME |
|---|---|---|---|---|
| 1) | 26.73130 | 5760 | | 00.9 |
| 2) | 26.43789 | 6000 | | 00.0 |
| 3) | 26.4791 | 4965 | | 02.2 |
| 4) | 26.4800 | 4965 | | 01.8 |

AVR = 26.4 HSU

Though the invention has been described above referring to the examples according to the attached drawings, it is clear that the invention is not limited to those, but it can be modified in many ways within the scope of the inventive idea presented in the attached claims.

We claim:

1. A catalytic exhaust gas purifier used especially for purifying exhaust gas emitted from diesel engines and containing particles, which exhaust gas purifier comprises a casing structure (1), in which are disposed a means (3) for feeding exhaust gas into the exhaust gas purifier, a means (4) for removing exhaust gas from the exhaust gas purifier, a combustion chamber (5) and at least one catalyst element (6), the means (3) for feeding exhaust gas being arranged in the combustion chamber (5) of the exhaust gas purifier in such a way that an exhaust gas flow (7) may be turned into rotational motion within the combustion chamber (5), whereby the exhaust gas flow is divided into a particle flow (9) and an actual gas flow (10), in which exhaust gas purifier the catalyst element (6) is arranged in the combustion chamber (5) in such a way that at least the particle flow is brought into rotational motion around the catalyst element (6) in the combustion chamber (5), wherein the exhaust gas purifier comprises means (12) for directing the exhaust gas flow (9, 10, 100) axially to the catalyst element (6) over an end (11) of the catalyst element (6), said means (12) being disposed in the vicinity of the catalyst element (6) positioned in the combustion chamber (5), means (13, 16, 26) for retarding the particle flow (9) separated from the actual gas flow (10) and means (12, 15, 17, 27) for rejoining the retarded particle flow (9) to the actual gas flow (10).

2. An exhaust gas purifier according to claim 1, wherein the means for retarding the particle flow consist of one or several catalyst element(s) (13, 16, 26).

3. An exhaust gas purifier according to claim 1, wherein the means for retarding the particle flow consist of one or several wall(s) (15, 17, 27), arranged against the flow direction of the particle flow, and also arranged to turn the particle flow essentially to the opposite direction with respect to the direction of propagation thereof.

4. An exhaust gas purifier according to claim 1, wherein the means (12) directing the gas flow to the catalyst element is positioned between catalyst element (6) and the means (13, 15) creating counterpressure in the combustion chamber (5).

5. An exhaust gas purifier according to claim 4, wherein the means (12) directing the gas flow to the catalyst element (6) is positioned between two catalyst elements (6, 13) arranged successively in the flow direction, whereby the first catalyst element (13) in the flow direction forms the means retarding the particle flow and the second catalyst element (6) in the flow direction is arranged to receive the rejoined flow of the particle flow (9) and the actual gas flow (10).

6. An exhaust gas purifier according to claim 5, wherein the densities of the catalyst elements (6, 13) differ from each other and the density of the first catalyst element (13) in the flow direction of the particle flow is clearly higher than that of the second catalyst element (6) in the flow direction.

7. An exhaust gas purifier according to claim 6, wherein the means (12) directing the gas flow between the catalyst elements (13 and 6) forms a means for rejoining the particle flow (9) to the actual gas flow (10).

8. An exhaust gas purifier according to claim 4, wherein the means (12) directing the gas flow to the catalyst element (6) comprises several openings (25) in its periphery, which openings are arranged at least partially away from the direction of rotation of the exhaust gas flow (9) directed to rotate around said means (12).

9. A catalytic method of purifying exhaust gas, in which exhaust gas is led into a combustion chamber of an exhaust gas purifier and the exhaust gas is brought into centrifugal rotational motion, by which the exhaust gas flow is divided into a particle flow and an actual gas flow, the method comprising, retarding the particle flow separated from the actual gas flow in relation to the actual gas flow, turning the direction of propagation of the particle flow to be essentially opposite, rejoining the particle flow to the actual gas flow, and directing the rejoined exhaust gas flow through a catalyst element (6) in the combustion chamber wherein the actual gas flow (10), which is more free from particles, is caught from the middle of the particle flow (9) in rotational motion and directed by a directing means (12) to the catalyst element (6), to which is also directed the retarded actual particle flow (9).

10. A method according to claim 9, which comprises turning the rejoined gas flow from the catalyst element (6) to the opposite direction towards a jacket space (21) surrounding the combustion chamber.

* * * * *